May 7, 1957 C. T. WALLIS 2,790,989
WINDSHIELD WIPER SHAFT ASSEMBLY
Filed Oct. 15, 1953 2 Sheets-Sheet 1

INVENTOR.
CYRIL T. WALLIS
BY
George H. Strickland
HIS ATTORNEY

May 7, 1957 C. T. WALLIS 2,790,989
WINDSHIELD WIPER SHAFT ASSEMBLY
Filed Oct. 15, 1953 2 Sheets-Sheet 2

INVENTOR.
CYRIL T. WALLIS
BY
George H. Strickland
HIS ATTORNEY ary view, partly in section and partly in elevation, of a motor vehicle equipped with the wiper shaft assembly of this invention.

United States Patent Office 2,790,989
Patented May 7, 1957

2,790,989

WINDSHIELD WIPER SHAFT ASSEMBLY

Cyril T. Wallis, Brockport, N. Y., assignor to General Motors Corporation, Detroit, Mich., a corporation of Delaware Application October 15, 1953, Serial No. 386,200

15 Claims. (Cl. 15—253)

This invention pertains to a windshield wiper shaft assembly, and particularly to a shaft assembly for imparting compound movement to a wiping element.

Present trends in motor vehicle body design indicate that in the near future, windshields will extend, or "wrap around," the sides of the motor vehicle. With this type of windshield, i. e. a curved transparency in which the side portions are disposed in substantially parallel planes, adequate cleaning thereof cannot be accomplished with conventional oscillatory cleaners, inasmuch as the wiping element must clean surfaces disposed at substantially right angles to each other. Accordingly, among my objects are the provision of means for imparting compound movement to a wiping element; the further provision of means for rocking a wiping element so as to enable it to follow the curvature of a transparency; and the still further provision of a wiper shaft assembly adapted to impart rocking motion to a blade upon oscillation thereof.

The aforementioned and other objects are accomplished in the present invention by employing a shaft assembly having a lever pivotally attached thereto and oscillatable therewith for imparting "rocking" motion to a wiping element during its oscillatory movement. Specifically, the cleaner comprises a wiper blade supported by a wiper arm, which is operatively connected to one end of a pivotally mounted lever. The lever is pivotally mounted in a slot of, and carried by, a wiper shaft. Inasmuch as the wiper shaft is rotatably supported within a bearing assembly, and is adapted for connection with any suitable oscillating mechanism, the lever and, hence, the wiper blade will oscillate with the wiper shaft.

In order to impart compound motion to the wiping element, this invention contemplates the use of a cam assembly, which constitutes an improvement over the mechanism disclosed and claimed in my copending application, Serial No. 376,647, filed August 26, 1953. The cam assembly includes a cam slot formed within the stationary shaft bearing or bushing, and a cam follower which is confined within the slot. The cam slot is contoured to suit the particular exigencies in use, which in the embodiment disclosed, is in conjunction with a transparency having front and side portions disposed in planes separated by an angle of substantially 90°. However, the specific cam embodiment is only exemplary, and is not to be construed as a limitation. The cam follower is constituted by a roller, which is attached to a sector gear that meshes with another sector gear formed on the shaft carried lever.

Further objects and advantages of the present invention will be apparent from the following description, reference being had to the accompanying drawings wherein a preferred embodiment of the present invention is clearly shown.

Figure 3:
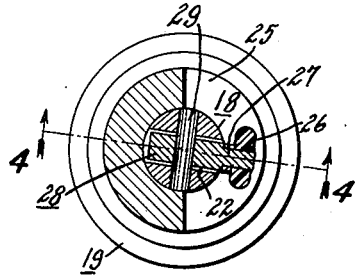
Figure 5:
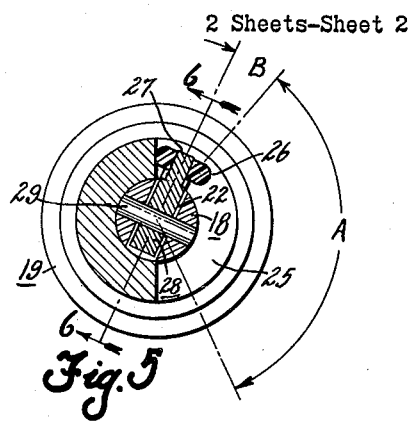
Figure 4:
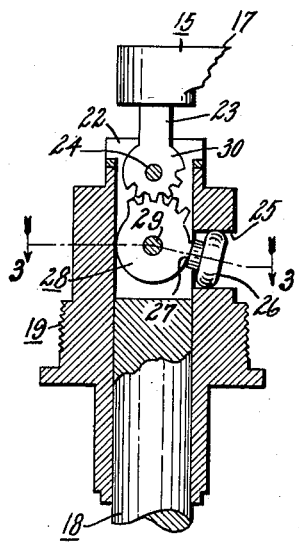
Figure 6:
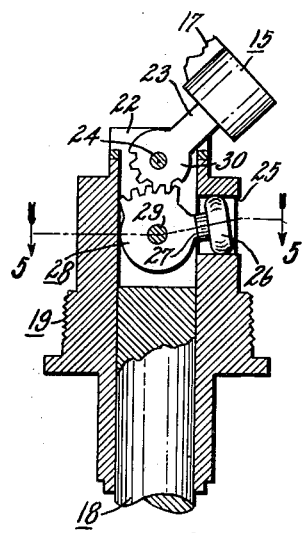
Figure 7:
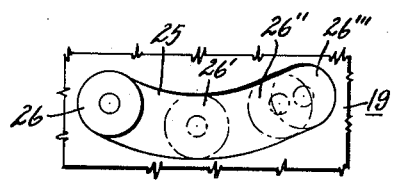

Fig. 3 is a sectional view taken on line 3—3 of Fig. 4.
Fig. 4 is a sectional view taken on line 4—4 of Fig. 3.
Fig. 5 is a sectional view taken on line 5—5 of Fig. 6.
Fig. 6 is a sectional view taken on line 6—6 of Fig. 5.
Fig. 7 is a fragmentary development of the cam slot.

Figure 1:
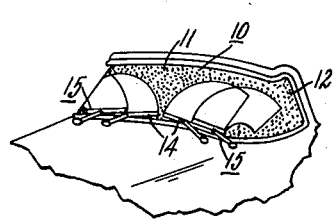
Fig. 1 is a fragmentary view, in perspective, of a motor vehicle equipped with four blades for cleaning a windshield having front and side portions.

With particular reference to Fig. 1, it may be seen that the vehicle transparency, or windshield 10, includes a front portion 11 and "wrap around" side portions, only one, 12, of which is shown in the drawings. The configuration of the windshield surface is such that the side portions thereof are disposed in substantially parallel planes, which planes are located at an angle of 90° with reference to the front portion 11. It will be appreciated that from the nature of the compound curved surface, a single wiping element, or blade, of conventional design, could not be used to clean a sufficient portion of the transparency. Accordingly, the present invention contemplates a cleaner comprising a conventionally mounted blade assembly 14 and an auxiliary blade assembly 15, which blades are operated in tandem on each side of the windshield so as to clean sections of the front and side portions. The four blade windshield wiper arrangement forms no part of this invention, and is more particularly disclosed and claimed in copending application, Serial No. 377,436, filed August 13, 1953, in the name of John B. Dyer, et al. Suffice it here to say that the auxiliary blade assembly 15 is constructed according to the present invention.

Figure 2:
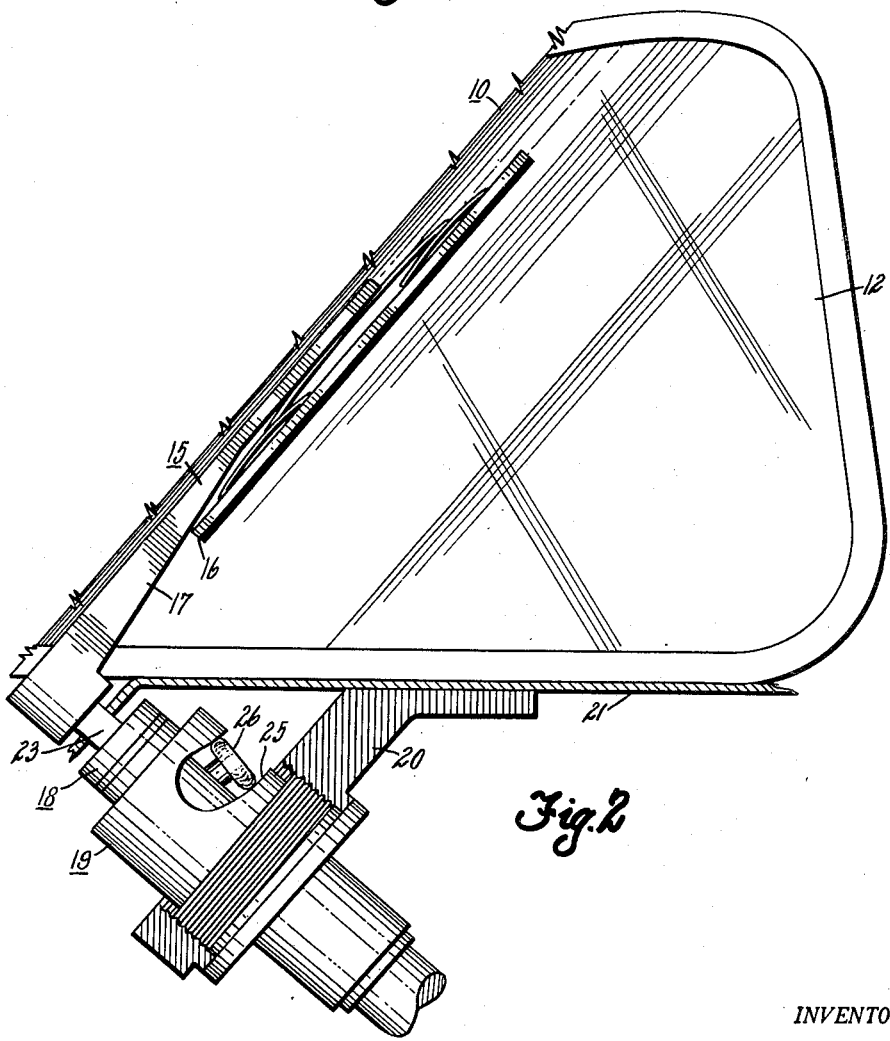
Fig. 2 is a fragmentary view, partly in section and partly in elevation, of a motor vehicle equipped with the wiper shaft assembly of this invention.

Referring more particularly to Fig. 2, the auxiliary blade assembly 15 is shown as comprising a conventional wiping element, or blade 16, which may be of the type shown in United States Patent 2,596,063, Anderson. The blade 16 is carried by a wiper arm 17, which is connected to oscillate with a wiper shaft 18. The wiper shaft 18 is rotatably supported in a through bore of a stationary bushing, or bearing 19, which is carried by a bracket 20 attached to the cowl portion 21 of the motor vehicle. Preferably, the bushing 19 is located so that the extension of shaft 18 projects through the cowl 21 at a point substantially midway between the front and side portions of the windshield 10.

Referring to Figs. 3 through 7, the construction of the wiper shaft assembly will next be described. The wiper shaft 18 is formed with a longitudinally extending slot 22 within which a lever 23 is pivotally supported by a pin 24 located normal to the axis of shaft 18. The free end of lever 23, in a conventional manner, is serrated for the reception of the wiper arm 17.

The bushing 19 is formed with a circumferential cam slot 25, which is adapted to receive a cam follower 26, which is in the form of a roller. The cam slot 25 is contoured to a particular curved transparency, and functions to rock the wiper arm assembly about an axis normal to the axis of the shaft 18, in a manner which will be more particularly pointed out hereinafter. The roller 26 is rotatably supported on a radial projection 27 formed on a sector gear 28, which is pivotally supported by a pin 29 in the slot 22 for rotation about an axis normal to the axis of shaft 18. The sector gear 28 meshes with a sector gear 30 formed on the end of lever 23 such that upon rotation of the sector gear 28 about pin 29, rocking motion will be imparted to lever 23 about pin 24.

With particular reference to Figures 4, 6 and 7, it may be seen that the cam slot 25 is of varying axial distance from the edge of the bushing 19. Thus, when oscillation is imparted to the shaft 18 by any suitable mechanism, not shown, the roller 26, which is confined within the slot 25 will traverse the cam slot and impart arcuate movement to the sector gear 28. Movement of the sector gear 28 will, in turn, be imparted to the lever 23 so as to "rock" the wiper arm assembly 15 about an axis at right angles to the shaft 18. In other words, the rocking of lever 23 about cross pin 24 will be in a plane normal to the plane of oscillation imparted to the blade assembly 15 by the shaft 18.

The mode of operation of the "rocking" wiper blade assembly 15 is as follows, having reference to Figures 1 through 7. When the roller 26 is in the full line position, as shown in Fig. 7, the wiper blade assembly 15 will be positioned at the end of its stroke on the side portion 12 of the vehicular transparency 10. During oscillatory movement of the shaft in a counterclockwise direction, as viewed in Figures 3 and 5, the roller 26 will follow the cam contour of slot 25 and in so doing, the wiper arm assembly 15 will be rocked outwardly until it reaches the midpoint between the front and side portions of the curved transparency 10, at which time the roller assumes the position of 26' of Fig. 7. Continued oscillatory movement of the shaft 18 in a counterclockwise direction will rock the wiper arm assembly 15 towards the curved transparency until it reaches the other end of the normal wiping stroke, at which time, the roller will be in the position 26". The normal wiping stroke is denoted by the angle A in Fig. 5. In accordance with the teachings of the aforementioned copending application, Serial No. 377,436, the oscillatory blade assembly 15 is moved to the parked position against the cowl of the motor vehicle throughout the angle B of Fig. 5, at which time, the roller is in the position 26''' of Fig. 7.

From the foregoing, it is manifest that the plane of action of the wiper blade assembly 15 changes continuously during oscillation of the wiper shaft 18 throughout the angles A and B by reason of the "rocking" imparted to the lever 23. In the instant embodiment, the wiper blade assembly 15 will be positioned in planes separated by an angle of substantially 90°, but it is readily apparent that the contour of cam slot 25 may be modified so as to position the blade assembly 15 in planes which are separated by either an acute or an obtuse angle. Moreover, the present invention provides a wiper arm assembly wherein the wiper arm and blade are deflected progressively about the axis of the wiper shaft during oscillatory movement of the shaft in accordance with the curvature of the transparency. The ratio between gears 28 and 30 is on the order of 2:1 so as to minimize the cam slope and, yet, obtain a "rocking" movement of the wiping arm assembly throughout an angle of substantially 45°. Moreover, when the wiper shaft assembly of this invention is used on some "wrap around" transparencies, it may be desirable to locate the wiper arm 17 so that the center line thereof is at an angle to slot 22 in the shaft 18. Of course, this adjustment may be made by merely removing the wiper arm 17 from the serrated head, not shown, on lever 23, so as to obtain the best wiping action, and to prevent the blade 16 from tilting about its pivotal connection with the arm 17, which connection is of the conventional type, not shown, throughout more than a predetermined angle during oscillatory movement of the wiper blade assembly.

While the embodiment of the present invention as herein disclosed, constitutes a preferred form, it is to be understood that other forms might be adopted.

What is claimed is as follows:

1. In combination, a vehicular transparency having portions located in different planes, a cleaner for said transparency having an oscillatable shaft and a wiping assembly, means including a lever having a toothed portion movable about an axis normal to the axis of said oscillatable shaft for interconnecting the shaft and the wiping assembly, and cam actuated means movable about an axis normal to the axis of the oscillatable shaft during oscillation of said shaft and engageable with the toothed portion of said lever for automatically imparting pivotal movement to said lever during oscillation of said shaft, the construction and arrangement being such that the wiping assembly has imparted thereto a rocking movement in a plane normal to the oscillatory movement during oscillation of said shaft.

2. In combination, a curved vehicular transparency having portions located in different planes, a cleaner for said transparency having an oscillatable shaft and a wiping assembly, means interconnecting the shaft and the wiping assembly including a lever having formed thereon a sector gear mounted for pivotal movement to an axis normal to the axis of said oscillatable shaft, and cam actuated means movable about an axis normal to the axis of said oscillatable shaft during oscillation of said shaft and engageable with said sector gear for automatically imparting pivotal movement to said lever during oscillation of said shaft, said lever thereby imparting compound movement to said wiping assembly to enable the said wiping assembly to follow the curvature of said transparency.

3. In combination, a curved vehicular transparency having front and side portions located in different planes, a cleaner for said transparency having an oscillatable shaft and a wiping assembly, means interconnecting the shaft and the wiping assembly including a gear, and means movable about an axis normal to the axis of the oscillatable shaft during oscillation of said shaft and engageable with said gear to automatically impart rocking motion to the said gear about an axis normal to the axis of said oscillatable shaft during oscillation of the said shaft.

4. Means for imparting compound motion to a wiping assembly comprising, an oscillatable shaft, a wiping assembly, means interconnecting the wiping assembly and the shaft including a gear adapted for pivotal movement about an axis normal to the axis of said oscillatable shaft, and cam actuated means movable about an axis normal to the axis of said oscillatable shaft during oscillation of said shaft and engageable with said gear for automatically imparting pivotal movement thereto upon oscillation of the said shaft.

5. Means for imparting compound motion to a wiping assembly comprising, an oscillatable shaft having a diametrical slotted portion, a wiping assembly, means interconnecting the wiping assembly and the shaft including a gear rotatably mounted within said shaft slot and adapted for movement about an axis normal to the axis of said shaft, and cam actuated means movable about an axis normal to the axis of said oscillatable shaft during oscillation of said shaft and engageable with said gear for automatically imparting rotative movement thereto during oscillation of the shaft.

6. Means for imparting compound movement to a wiping assembly comprising, an oscillatable shaft, means supporting said shaft for rotation, said means having a cam surface, a wiping assembly, means interconnecting the wiping assembly and the shaft including a gear adapted for pivotal movement about an axis normal to the axis of said shaft, and a cam follower operatively connected to said gear, said cam follower being supported for movement about an axis normal to the axis of said shaft and engaging said cam surface so as to move about its axis during oscillation of said shaft whereby upon oscillation of said shaft, rocking movement is imparted to said gear and wiping assembly.

7. Means for imparting compound motion to a wiping assembly comprising, an oscillatable shaft having a diametrical slot therein, a bearing member supporting said shaft for oscillation and having a cam surface, a wiping assembly, means interconnecting the shaft and the wiping assembly including a gear rotatably supported in said shaft slot for rocking movement about an axis normal to the axis of said shaft, and a cam follower operatively connected to said gear and engaging said cam surface, said cam follower being supported for movement about an axis normal to the axis of said shaft and being moved about its axis due to engagement with said cam surface during oscillation of said shaft for imparting rocking movement to said gear and said wiping assembly during oscillation of said shaft.

8. Means for imparting compound movement to a wiping assembly comprising, a bearing member having a through bore, an oscillatable shaft rotatably journaled within the through bore of said member, said shaft having a diametrical slot therein, said member having a circumferential cam slot communicating with said through bore, a wiping assembly, means interconnecting the shaft and the wiping assembly including a lever pivotally connected to said shaft within said slot for rocking movement about an axis normal to the axis of said shaft, and a cam follower operatively connected to said lever and having engagement with said cam slot, said cam follower being supported for movement about an axis normal to the axis of said shaft and movable about its axis by engagement with said cam slot during oscillation of said shaft for imparting rocking movement to said lever and said wiping assembly during oscillatory movement of said shaft.

9. The combination set forth in claim 8 wherein said lever is pivotally supported in said shaft slot by a cross pin located substantially normal to the axis of said shaft, and wherein said lever is formed with a toothed portion which is operatively connected with said cam follower so as to impart rocking movement to the lever and the wiping assembly during oscillatory movement of said shaft.

10. Means for imparting compound movement to a wiping element comprising, a bearing member having a through bore, an oscillatable shaft rotatably journaled within the through bore of said member, said shaft having a diametrical slot therein, said member having a circumferential cam slot communicating with said through bore, a wiping element, means interconnecting said shaft and said wiping element including a lever pivotally supported in said shaft slot by a cross pin located substantially normal to the axis of said shaft, said lever having a toothed portion, a toothed member having engagement with the toothed portion of said lever and supported for rotation about the axis normal to the axis of said shaft within said shaft slot, and a roller carried by said toothed member and confined within the cam slot of said bearing member for imparting rotation to said toothed member which, in turn, imparts rocking movement to said lever and said wiping element during oscillation of said shaft.

11. A wiper shaft assembly comprising, a stationary bearing member having a through bore, an oscillatable shaft rotatably supported within the through bore of said member and having a diametrical slot, a lever pivotally supported within the slot of said shaft for movement about an axis normal to the axis of said shaft and oscillatable therewith, and means including a cam slot formed in said bearing member and a cam follower operatively associated with said lever and said cam slot for imparting rocking movement to said lever upon oscillation of said shaft.

12. A wiper shaft assembly comprising, a bearing member having a through bore, an oscillatable shaft rotatably supported within the through bore of said member and having a slot therein, said member having a circumferential cam slot communicating with said through bore, a lever disposed in said shaft slot and pivotally connected thereto for rocking movement about an axis normal to the axis of said shaft, and means including a cam follower confined within the cam slot of said member and operatively connected with said lever for imparting rocking movement thereto upon oscillation of said shaft.

13. The combination set forth in claim 12 wherein said lever is formed with a toothed portion, and wherein the operative connection between said lever and said cam follower includes a sector gear having engagement with the toothed portion of said lever.

14. The combination set forth in claim 13 wherein said sector gear is formed with a radially projecting arm which supports said cam follower.

15. A wiper assembly comprising, a bushing, an oscillatable shaft journaled in said bushing and having a diametrical slot therein, said bushing having a circumferential cam slot in a wall thereof, a lever pivotally connected to said shaft within said slot for rocking movement about an axis normal to the axis of said shaft, a wiper arm connected to said lever, a wiper blade carried by said wiper arm, and a cam follower confined within the cam slot of said bushing and operatively connected to said lever for imparting rocking movement to said lever, said wiper arm and said wiper blade during oscillation of said shaft.

References Cited in the file of this patent

UNITED STATES PATENTS

| | | |
|---|---|---|
| 1,866,700 | Farmer | July 12, 1932 |
| 2,412,319 | Carey | Dec. 10, 1946 |
| 2,533,963 | Sacchini | Dec. 12, 1950 |